(No Model.)

E. P. BURT.
THILL COUPLING.

No. 443,066.  Patented Dec. 16, 1890.

WITNESSES:
F. L. Durand.
Arthur L. Morsell

INVENTOR:
Elnathan P. Burt,
by Sams Bagger & Co,
Attorneys.

UNITED STATES PATENT OFFICE.

ELNATHAN P. BURT, OF WELLSVILLE, NEW YORK, ASSIGNOR OF TWO-THIRDS TO FREELAND & BRADLEY, OF SAME PLACE.

THILL-COUPLING.

SPECIFICATION forming part of Letters Patent No. 443,066, dated December 16, 1890.

Application filed May 12, 1890. Serial No. 351,512. (No model.)

*To all whom it may concern:*

Be it known that I, ELNATHAN P. BURT, a citizen of the United States, and a resident of Wellsville, in the county of Allegany and State of New York, have invented certain new and useful Improvements in Shifters for Vehicle Poles or Thills; and I do hereby declare that the following is a full, clear, and exact description of the invention, which will enable others skilled in the art to which it appertains to make and use the same.

My invention has relation to shifters for vehicle poles or thills to take the place of the ordinary thill-coupling or shaft-shackle.

The object of my invention is to provide for the shifting or adjusting of the device, so that the same may be adapted to vehicles in which the shackles which embrace the axle are arranged thereon at varying distances apart, or vehicles in which either the shafts or the ends of the curved bar to which the pole is centrally attached (when used in connection with a vehicle for double harness) are arranged at greater or less distances apart.

With the above objects in view my invention consists in the improved construction and combination of parts, as hereinafter more fully described and set forth.

Figure 1:
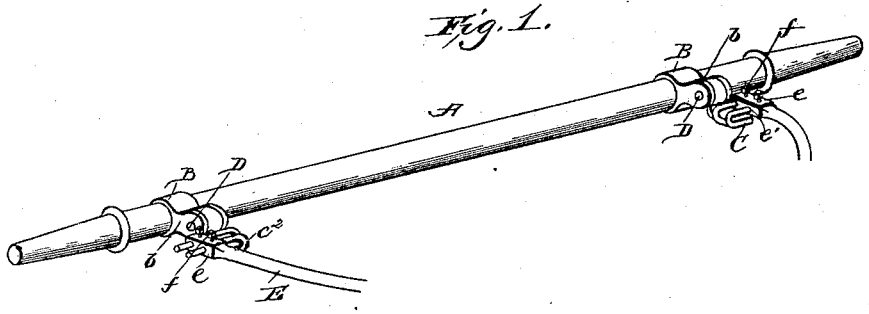
Figure 2:
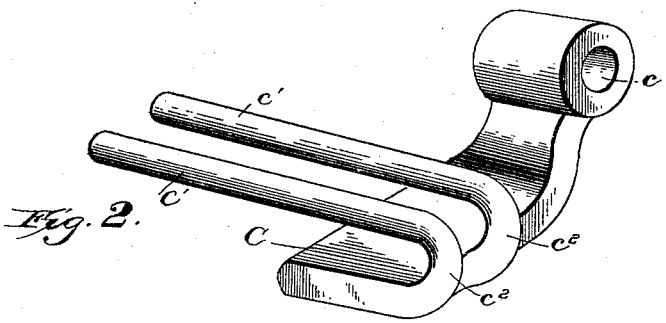
Figure 3:
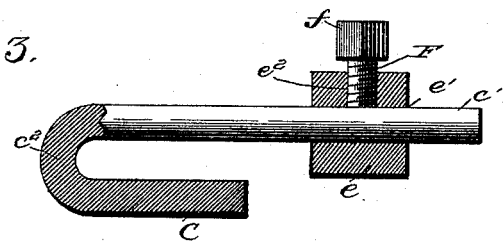

In the accompanying drawings, Figure 1 is a perspective view of my device, showing the same applied to an axle and pole. Fig. 2 is a view of my invention in perspective removed from the vehicle, and Fig. 3 is a cross-sectional view.

Like letters of reference denote like parts throughout the several views.

Referring to the drawings, the letter A indicates the fore axle of a vehicle, having the usual clips or shackles B B, which are provided with perforated ears $b$ $b$.

The letter C indicates a plate formed with a draft-eye $c$, adapted to be inserted between the perforated ears $b$ $b$ and to turn upon a transverse pivotal bolt D. This plate is provided with laterally-extending rounded arms $c'$ $c'$, formed integral therewith and bent at the points $c^2 c^2$, so that they will occupy a horizontal plane above the plane of the plate proper.

The letter E indicates a stub provided upon its rear end with a headed portion $e$, which latter is provided with transverse perforations $e'$ $e'$, and also with vertical screw-threaded perforations $e^2$ $e^2$. Through the former of these perforations the laterally-extending arms pass freely, while into the latter perforations pass screw-threaded bolts F F, having heads $f f$ for turning or operating the same. In this manner it will be clearly seen that the laterally-extending arms may be adjusted with relation to the stub by simply loosening the set-screws or bolts and subsequently tightening the same after the desired adjustment is attained.

As ordinarily constructed, the poles or thills of vehicles terminate in eyes, by means of which they are connected with the shackles or clips of the fore axle. In order to adapt my device, therefore, to a pole of this character, all that is necessary to be done is simply to cut off the end eyes above referred to and weld the stub E to the ends of said pole.

It is of course evident that two of my improved shifters are employed in connection with a vehicle; but for the sake of brevity, and inasmuch as each of the devices are analogous in construction, the invention has been described in the singular number. It is also apparent that these shifters are reversible or interchangeable—that is to say, the left-hand one shown in the drawings may be changed to the right, and vice versa. When thus arranged, the laterally-extending arms $c'$ $c'$, instead of projecting outwardly, will project inwardly. This adjustment of the devices with reference to the clips or shackles of the fore axle will be found advantageous when said clips are arranged at a considerable distance apart; or, in other words, a given pole used in a vehicle in which the shackles or clips are a certain distance apart the same pole could be used in connection with a vehicle having the shackles or clips at a much greater distance apart.

It will be seen that my device possesses many advantages. It not only embodies the capacity for easy and ready adjustment, but, furthermore, is exceedingly simple in construction and can be manufactured at a minimum of cost. The headed portion $e$ of the stub E also affords a double bearing for the laterally-extending arms and gives double strength to the shifter, also holding the arms $c'$ $c'$ in such a position that they cannot be wrenched out of place. The bends of these arms also throw the draft-eyes in such a position that they can reach the clip on vehicle-axle at any point, even at the end of the headed portion of the stub, and can be moved the length of the arms or a hair's breadth without throwing the draft-eyes out of line with the clips on the axle. Furthermore, the device is firmly braced, adding rigidity and strength to the maximum.

Having thus described my invention, what I claim, and desire to secure by Letters Patent of the United States, is—

In a shifter for vehicle poles or thills, the combination of the thills or pole having imperforate ends, a plate having a rearwardly and upwardly extending draft-eye and also formed or provided with one or more laterally-extending arms, said arms being bent at their points of connection with the draft-eye, so as to bring the same upon a horizontal plane above the horizontal plane of the draft-eye plate and extending across the plate and projecting beyond the opposite side thereof, a stub having its forward end welded to the end of the thills or pole and its rear end provided with a headed portion having transverse apertures and vertical screw-threaded apertures, and set-screws adapted to pass into said screw-threaded apertures, substantially as set forth.

In testimony that I claim the foregoing as my own I have hereunto affixed my signature in presence of two witnesses.

ELNATHAN P. BURT.

Witnesses:
GEORGE E. BALDWIN,
SAMUEL B. WRAY.